Sept. 14, 1965 T. LOCHER 3,205,884
BUILT-IN BAKING OVENS
Filed April 9, 1962 2 Sheets-Sheet 1

Sept. 14, 1965     T. LOCHER     3,205,884
BUILT-IN BAKING OVENS

Filed April 9, 1962     2 Sheets-Sheet 2

United States Patent Office 3,205,884
Patented Sept. 14, 1965

3,205,884
BUILT-IN BAKING OVENS
Theodor Locher, 16 Waldgartenstrasse, Zollikerberg, Zurich, Switzerland
Filed Apr. 9, 1962, Ser. No. 186,108
Claims priority, application Switzerland, Apr. 12, 1961, 4,320/61
8 Claims. (Cl. 126—19)

While in the kitchen stoves generally in use a baking oven is arranged below the cooking plates, one has recently gone over to provide baking ovens, which are built into a wall or into a piece of kitchen furniture.

The main object of this arrangement is to obviate the necessity of bending down for inserting the articles to be baked into, and taking the baked articles out of, the ovens of the kind referred to.

The present invention relates to a built-in baking oven with a downwardly hinged door and a switch front plate.

With known built-in baking ovens of this kind the switch front plate is arranged above the hinged door. As detailed investigations and tests have proved and as described in more detail in the following description, very considerable disadvantages result therefrom.

It is the principal object of the present invention to obviate these disadvantages.

With this and other objects in view which will become apparent later from this specification and the accompanying drawing, I provide a built-in baking oven, comprising in combination: a baking compartment, heating elements in operation heating said baking compartment, a downward hinged door affording access to said baking compartment, a front plate arranged below said door, at least one switch member mounted on said front plate and operatively connected to and controlling said heating elements, and a gutter arranged between the lower edge of said door and said front plate and in operation collecting any condensate forming on the inside of said door.

Preferably said door comprises an inner sheet metal panel, an outer sheet metal panel and a heat insulation arranged between said two panels, said outer panel having a lower margin turned back, and said inner panel having a lower margin inclined downward and positioned outside said lower margin of the outer panel forming a drip ledge, from which condensate may drip off in operation into said gutter.

These and other features of my present invention will be readily understood from the following description of a preferred embodiment thereof given by way of example with reference to the accompanying drawings.

Figure 1:
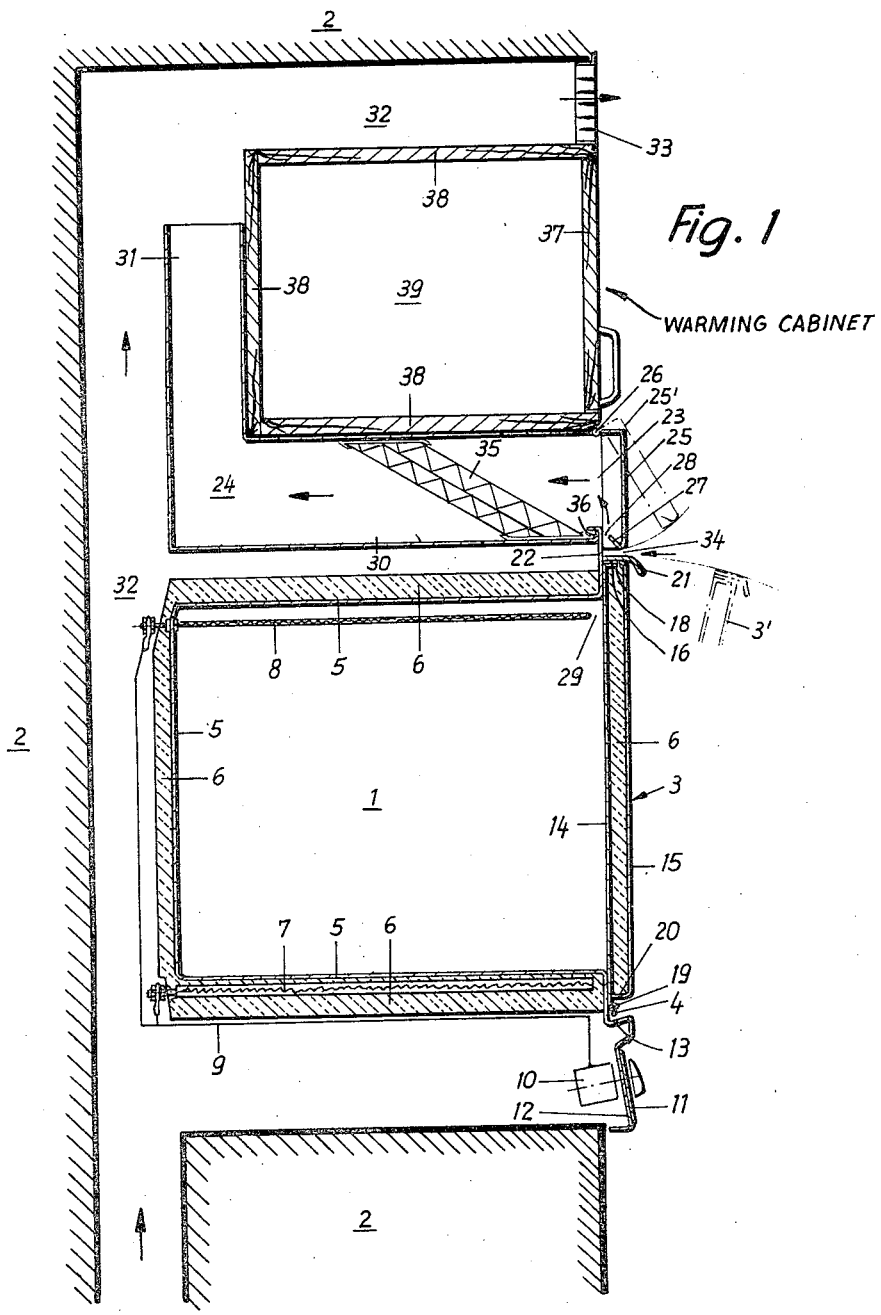
FIG. 1 is a schematic sectional elevation of a baking oven.

The baking oven, the baking chamber of which is denoted 1, is built, according to the drawing, into a wall 2, but could alternatively be built into a piece of kitchen furniture, e.g. a cupboard. The baking chamber 1 is bounded in front by a downwardly hinged door 3, which can be folded down about a lower horizontal axes 4 formed by laterally arranged hinges (not shown), as indicated at 3' in chain-dotted lines. The door 3 as well as the stationary walls 5 bounding the parallel pipedon shaped baking chamber on the other sides, consist of sheet metal panels and are provided with a heat insulation 6. Immediately below the bottom panel a heating resistor element 7, and immediately below the panel forming the ceiling, i.e. in the baking chamber itself, a further heating resistor element 8 is arranged. The heating resistor elements 7 and 8 are connected by conductors 9, illustrated as being unipolar, to an electric switch 10 mounted on a front plate 11.

The switch front plate 11 is located below the hinged door 3 instead of above the same as usual with built-in baking ovens. This entails important advantages, which will be explained later in more detail.

The front plate 11 is fixed to a lower front cover panel 12 of sheet metal, which is integral with the lower stationary wall 5. The sheet metal cover panel 12 forms a gutter 13 above the switch 10 which serves for catching any condensate forming on the inner surface of the door 3 and penetrating outwardly between the latter and the sheet metal cover panel 12. Thereby any fouling of the front plate 11 and of the faces of the wall of furniture below the same is prevented. This gutter is closed at both ends, so that the condensate cannot run off there. The distance between the lower edge of the door 3 and the gutter 13 has been chosen so that the gutter may be dried and cleaned any time by means of a flannel or the like.

The hinged door 3 comprises in the usual manner an inner and outer sheet metal panel 14 and 15, respectively, between which there is a heat insulation 6. The upper edge 16 bent forward, of the inner sheet metal panel 14 is located in the usual manner within the upper edge 18, bent back, of the outer sheet metal panel 15. On the other hand, the lower edge 19 of the inner sheet metal panel 14, is arranged in contrast to the usual construction, outside the rearwardly bent lower edge 20 of the outer sheet metal panel 15, and is sloping downwardly, so that a dripping ledge is formed by it, on the back of which runs the condensate so as to drip off it into the gutter 13. Thereby the condensate is prevented from getting to the inside of the lower margin 20 of the forward sheet metal panel 15, as it happens with ordinary door, where this involves the rusting of the forward sheet metal panel the inner surface of which generally is not sufficiently enameled to prevent this.

The door 3 is provided adjacent, its upper edge with a handgrip 21, on which it is seized for folding the same down. The door is secured by springs (not shown) or by equivalent means in its closed position, so that it moves by its own weight into its horizontal folded-down position defined by abutments, only after it has been opened by hand a certain angle. In its closed position an upper portion of the inner sheet metal panel 14 of the door almost abuts an upper frontal sheet metal panel 22, which is connected with the upper wall sheet metal panel 5 and reaches round the lower forward edge of the inlet opening 23 of a steam vent duct 24. Ahead of this inlet opening 23 a vent flap 25 is arranged, which can be turned about an upper horizontal axle 26, as indicated at 25' in chain-dotted lines. The lower edge 27 of the vent flap 25 is turned inward and upward, so that with the flap closed, a slot 28 is formed between the same and the upper frontal cover sheet metal panel 22.

The upper part of the inner door sheet metal panel 14 does not contact the upper frontal sheet metal panel 22 in a steam-tight manner, but leaves a narrow gap 29 between it, at least at some places (not shown in the drawing) through which the steam developing in the baking chamber 1 is vented, and can pass through the slot 28 and the inlet opening 23 into the steam vent duct 24.

The steam vent duct 24 has a first, horizontal part 30 adjacent the inlet opening 23, and a second, vertical part 31, which issues into the upper portion of an air flow conduit 32, which extends from a lower inlet opening (not shown) firstly vertically upward between the rear of the baking oven and the wall 2 (or rear face of the piece of furniture) and hence horizontally to a grilled outlet opening 33. By heating the baking chamber 1 the air in the vertical part of the conduit 32 is heated and thus a buoyancy is generated which induces a flow as indicated by arrows, which flow in turn through the steam vent duct 24, sucks off the steam escaping from the slot 29. Thereby the steam sucked off is moreover mixed with fresh air, which is aspirated through a gap 34 bounded by the door 3 and the flap 25.

In the first horizontal part 30 of the steam vent conduit 24 an inclined, removable filter 35 is arranged, which cleans the steam, retaining primarily the fat content of the latter. Preferably the filter 35 contains also activated carbon or similar adsorbents serving as deodorizers. The moist air issuing through the outlet opening 33 of the duct 32 into the kitchen is accordingly almost free from constituents, which upon the condensation of the moisture, e.g. on a cold kitchen wall, could cause fouling, and is free from smells to a great extent.

The forward margin 36 of the bottom panel of the horizontal part 30 of the duct is bent up so that any condensate which may form in the duct 24 at the beginning of the operation, cannot run off but is retained in the part 30 of the duct and later evaporates again or can be absorbed by a flannel or the like when cleaning the duct. This cleaning can be readily effected after opening the flap 25 and taking out the filter 35.

Above the duct portion 30 there is arranged a chamber 39 provided with a flap 37 but otherwise closed by walls 38, which may be used for any purpose desired, for example as a warming cabinet.

It should be remarked that on the switch front plate 11 usually there is mounted not only a single switch 10, but other switches and/or measuring- or control-devices, e.g. a program switch and a timer, in order to operate the baking oven automatically according to a predetermined program.

With the known built-in baking ovens the switch front plate 11 is arranged above the hinged door 13, between the latter and the vent flap 25. This has the disadvantage that the vapors escaping from the baking chamber 1 heat up the switch front plate and the switches and measuring- or control-devices mounted thereon, which is not only detrimental to these switches and devices, but is also felt to be unpleasant when operating the same. Moreover the vapors partly condense on the switch front plate and foul the same.

In order to counter this disadvantage built-in baking ovens have been made, the switch front plate of which is arranged higher still, namely above the vent duct 24. Although the heating-up and fouling of the switch front plate is somewhat reduced thereby, other disadvantages result instead. Firstly, the supply lines are lengthened from the switches and measuring- or control-devices to the heating resistor elements 7 and 8 or to other corresponding devices, e.g. to a micro wave generator arranged below the baking chamber 1 and connected with said chamber through a hollow micro wave guide. This has the consequence, that the vent duct has to be made as small as possible in the vertical direction and the flap 25 is dispensed with, which entails in turn the disadvantage that the vent duct has an unsightly aperture interrupting the front of the oven, and that it is difficult to clean because of its low clear height.

It is obvious that all these disadvantages are completely overcome by the built-in baking oven described.

It is clear that when folding down the door 3 the vapors escape upwardly in a broader flow than with the door 3 shut. Consequently, when opening the door 3, also the flap 25 is opened, so that it can catch completely the broad flow of the vapors. In order to hold itself in its open position, the flap 25 may be provided with a detent device or with friction means.

During the operation proper, e.g. when baking, roasting, grilling, etc. with the door closed the vapors are vented completely invisibly without the necessity of opening the flap 25. By aspirating the cool fresh air through the gap 34, between the door 3 and the flap 25, the hand grip 21 of the door is cooled very effectively. The height of the vent conduit, unlimited by considerations of electrical conductors, allows the building-in of deodorizers and fat-catcher filters 35, so that the returning of the cleaned air to the kitchen does not involve any disadvantages, in contrast to the usual baking ovens. Obviously the outlet end of the conduit 32 may be made to issue in a known manner outside the kitchen into the open air, which is however, mostly obviated because of the increased costs.

It should also be remarked that the front plate 11 may be made in one piece with the lower front sheet metal panel 12. When the baking oven is not arranged for resistor or micro wave heating, but for gas heating, the switches arranged on the front plate are obviously gas taps.

While I have described herein, and illustrated in the accompanying drawing what may be considered a typical and particularly useful embodiment of my said invention, I wish it to be understood, that I do not limit myself to the details and dimensions described and illustrated for obvious modifications will occur to a person skilled in the art.

Figure 2:
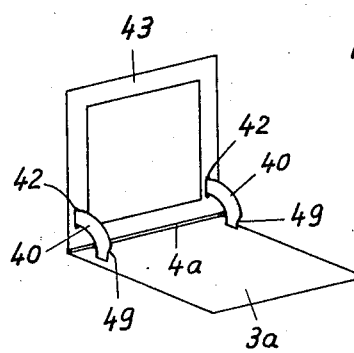
FIGS. 2 and 3 show schematically a modification of the oven of FIG. 1, with a mechanism coupling the hinged door with a venting flap, FIG. 2 showing the open hinged door in perspective view and FIG. 3 an elevation of the mechanism.
Figure 3:
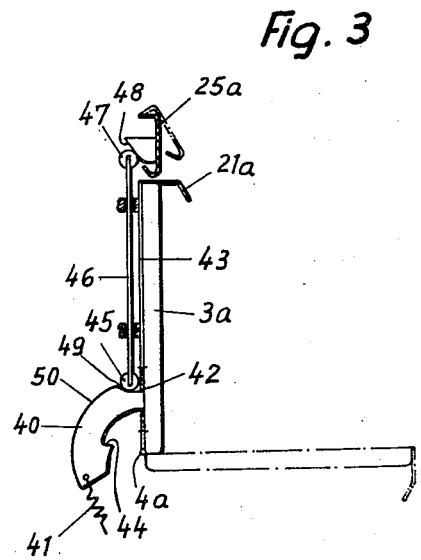

In the modification as represented in FIGS. 2 and 3 the hinged door 3a and the venting flap 25a are coupled so, that by opening and closing the hinged door 3a also the venting flap is opened and closed. The door 3a hinged about the axis 4a is provided with two bent arms 40, pulled by springs 41 and passing through slots 42 of a door frame 43. The springs 41 maintain the hinged door 3a in its closing position and counterbalance partially its weight during the opening or closing movement. The arms 40 have stops 44 that bear on the interior border of slots 42, when the hinged door 3a has reached a horizontal position, preventing it from hanging downwards.

Each arm 40 forms a cam for a roller 45, that is positioned at the lower end of vertically guided rod 46, that at its upper end is also provided with a roller 47. The upper roller 47 engages a cam 48 that is positioned at the inner surface of the venting flap 25a. It can readily be seen, that by opening the hinged door 3a the lower roller 45 is raised out of a recess 49 of the arm 40 on a circular portion of this arm and that thereby also the venting flap 25a is opened through the upper roll 47 and the cam 48.

Obviously many other coupling mechanisms can be provided between hinged door and venting flap, for the same purpose.

What I claim as my invention, and desire to secure by Letters Patent, is:

1. A built-in baking oven, comprising in combination: a generally hollow sheet-metal structure defining a box-like baking compartment having a rectangular open front end, heating elements for heating said baking compartment, a downwardly hinged oven door for closing said front end and for providing access to said baking compartment, a metal front plate extending downward from the lower marginal edge of said front end, said front plate being partially covered by said oven door when in closed position and being formed to extend below said oven door, switching means disposed on the lower portion of said front plate and being operatively connected to and controlling said heating elements, said front plate in the region between said switching means and the lowermost edge of said oven door, when the latter is in said closed position, being formed with an integral horizontal portion turned outwardly and upwardly of said baking compartment to define a horizontal gutter, narrow passage means between said front plate and said oven door, when the latter is in closed position, communicating between the interior of said oven and the region of the upper surface of said gutter, said passage means permitting condensate, within said oven and on the inner face of said oven door to drain gravitationally into said gutter.

2. A built-in baking oven as in claim 1, wherein said gutter is disposed below said oven door a distance sufficient to permit cleaning said gutter while said oven door is in closed position.

3. A built-in baking oven as claimed in claim 2, wherein said door includes an inner sheet metal panel, an outer sheet metal panel and a heat insulation arranged between said two panels, said outer panel having a lower margin turned inwardly under said insulation, and said inner panel having a lower margin positioned below said inwardly turned lower margin of said outer panel, said lower margin of said inner panel being inclined downward whereby to form a drip ledge from which condensate on said inner panel may drip off into said gutter.

4. A built-in baking oven as in claim 2, and including a steam venting duct, said duct having an opening substantially in the plane of said open front end of said baking compartment and lying above said compartment and said oven door when the latter is in closed position, a flap substantially covering said opening of said duct and being upwardly hinged for uncovering said duct opening, said flap having a lower edge portion turned upwardly and inwardly toward said duct opening and defining a narrow air passage into said duct in the region of the upper edge of said oven door when the latter is in closed position, said sheet metal structure in said region of the upper edge of said oven door providing a narrow passage communicating between the interior of said baking compartment and said narrow passage into said duct at the upper edge of said oven door adjacent said turned edge of said flap, whereby vapors emerging from said baking compartment through said last mentioned narrow passage are aspirated into said venting duct with air entering said duct in the region between said lower edge of said vent flap and said upper edge of said oven door when the latter is in closed position.

5. A built-in baking oven as claimed in claim 4, comprising a detachable fat catcher arranged in said steam venting duct.

6. A built-in baking oven as claimed in claim 4, comprising a de-odorizing filter detachably mounted in said steam venting duct.

7. A built-in baking oven as claimed in claim 4, wherein said venting duct comprises a bottom panel having a forward margin turned up at the inlet of said duct, in operation preventing any condensate forming in said duct from running off.

8. A built-in baking oven as claimed in claim 4, comprising coupling means coupling said hinged door and said venting flap whereby they open and close in unison, downward and outward hinged operation of said oven door being effective to swing said venting flap upward and outward.

References Cited by the Examiner
UNITED STATES PATENTS

| | | | |
|---|---|---|---|
| 1,755,691 | 4/30 | Heise | 126—190 |
| 1,872,020 | 8/32 | Taylor | 126—190 |
| 2,622,582 | 12/52 | Pollock | 126—21 |
| 2,739,584 | 3/56 | Hupp | 126—21 |
| 2,879,370 | 3/59 | Kesling | 126—299 |
| 2,905,073 | 9/59 | Aveni | 98—115 |
| 3,051,158 | 8/62 | Kimberly | 98—115 X |

JAMES W. WESTHAVER, *Primary Examiner.*
FREDERICK L. MATTESON, JR., *Examiner.*